W. P. HAMMOND.
MIRRORED WIND SHIELD FOR AUTOMOBILES.
APPLICATION FILED JULY 19, 1913.
1,283,164.
Patented Oct. 29, 1918.
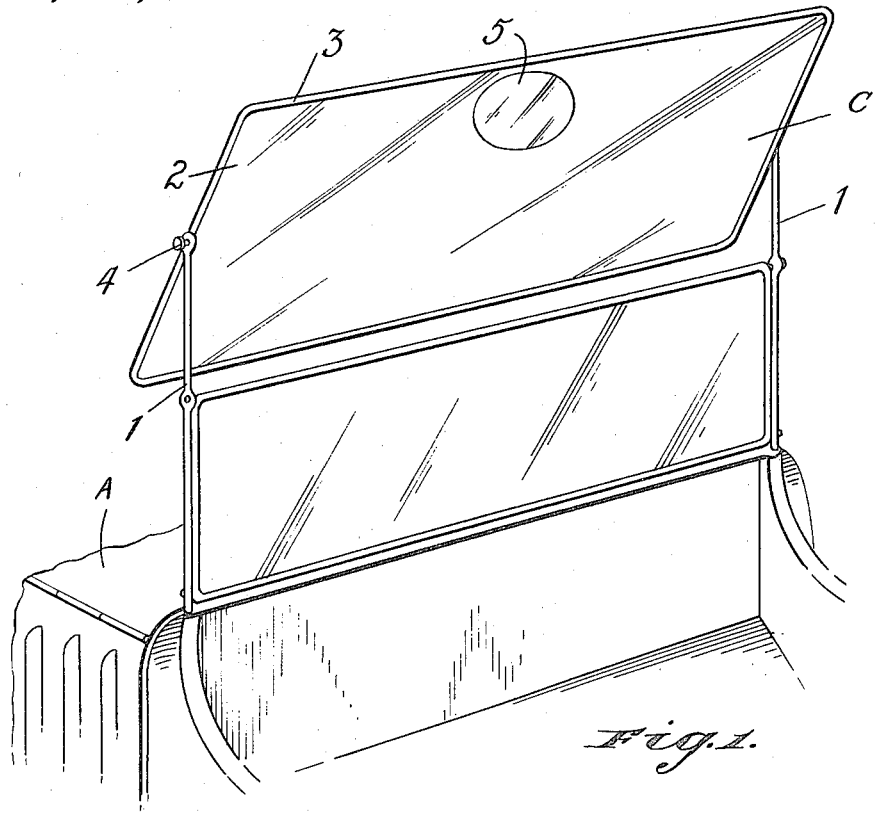
Fig. 1.
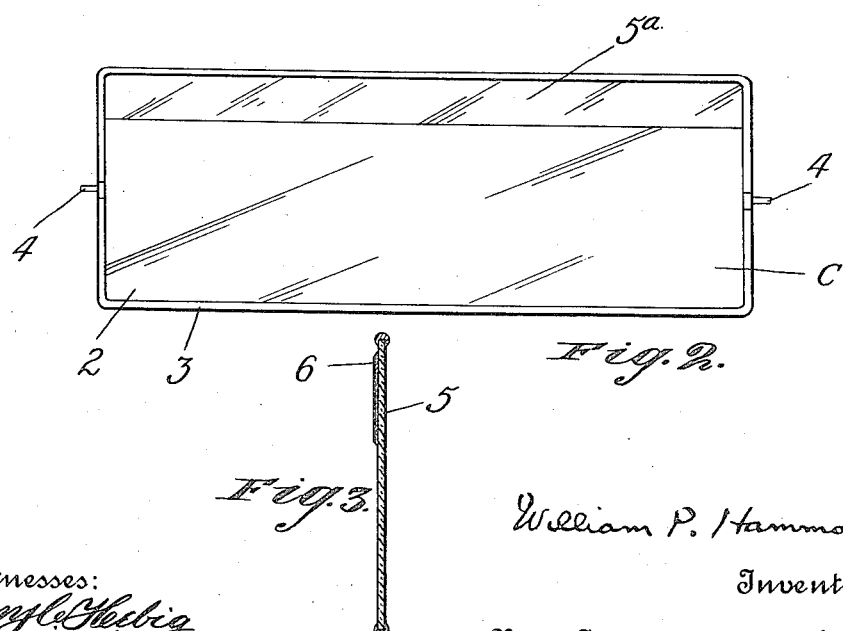
Fig. 2.
Fig. 3.
Witnesses:
William P. Hammond
Inventor
By Attorney N. S. Hill

UNITED STATES PATENT OFFICE.

WILLIAM P. HAMMOND, OF NEW YORK, N. Y.

MIRRORED WIND-SHIELD FOR AUTOMOBILES.

1,283,164.

Specification of Letters Patent.

Patented Oct. 29, 1918.

Application filed July 19, 1913. Serial No. 779,906.

*To all whom it may concern:*

Be it known that I, WILLIAM P. HAMMOND, citizen of the United States, residing at New York, in the county of New York and State of New York, have invented certain new and useful Improvements in Mirrored Wind-Shields for Automobiles, of which the following is a specification.

The present invention relates to a combined wind shield and mirror for automobiles and like vehicles, and has for its object to provide a novel means for combining the wind shield and mirror in a single construction, thereby eliminating the expense and inconvenience incident to the use of a mirror as a separate and independent attachment.

A further object of the invention is to provide a mirrored wind shield which can be manufactured at substantially the same cost as an ordinary wind shield, which can be used both as a wind shield and a mirror, and which is susceptible of adjustment in the usual manner.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawing, in which:—

Figure 1 is a perspective view of a mirrored wind shield constructed in accordance with the invention.

Fig. 2 is a plan view of a wind shield section, showing a slight modification of the invention, and Fig. 3 is a transverse sectional view through the mirrored wind shield.

Corresponding and like parts are referred to in the following description and indicated in all the views of the drawing by the same reference characters.

Referring to the drawings, the reference character A designates a portion of the body of an automobile or like vehicle. The wind shield at the front of the vehicle may be of any suitable construction, and in the present instance is shown as comprising a lower section B and an upper section C, the said sections being mounted between the two standards 1. The upper section C of the wind shield comprises a transparent sheet 2 of plate glass or the like surrounded by a metallic frame 3, opposite ends of the said frame being provided with the trunnions 4 which are journaled within suitable bearings upon the standards 1 to admit of the wind shield section C being tilted about a horizontal axis.

In carrying out the invention a portion of the plate glass 2 is designed to be silvered at 5 or otherwise provided with a reflecting surface adapted to form a mirror. As indicated by Fig. 1, the silvered or mirrored surface 5 is substantially circular or elliptical in shape, while in the modification shown by Fig. 2 the silvered or mirrored portion 5a constitutes a narrow strip which extends entirely across the top of the wind shield. It will be obvious that the silvered or mirrored surface may be of any desired size or shape and may be situated at the most advantageous point upon the wind shield, according to the make of the car and the personal ideas of the user. The silvered surface 5 may be protected by any suitable backing 6, and the wind shield section C, can be tilted to any desired angle so as to set the mirrored surface thereof at the proper inclination.

Having thus described the invention, what I claim as new and desire to secure by Letters Patent, is:—

A wind shield for automobiles including a transparent glass plate having a portion of the surface thereof silvered to provide a reflecting surface adapted to act as a mirror.

In testimony whereof I affix my signature in presence of two witnesses.

WILLIAM P. HAMMOND.

Witnesses:
GEORGE EBERHARDT, Jr.,
P. FRANK SONNEK.